July 25, 1950　　　　　　C. S. BROWN　　　　　2,516,546
BATTERY ASSEMBLY JIG

Filed Nov. 2, 1946　　　　　　　　　　　　4 Sheets-Sheet 1

INVENTOR.
C. Stanley Brown
BY
ATTORNEY

July 25, 1950

C. S. BROWN 2,516,546

BATTERY ASSEMBLY JIG

Filed Nov. 2, 1946

INVENTOR.
C. Stanley Brown
BY
*Cearleen & Hayle*
ATTORNEY

July 25, 1950  C. S. BROWN  2,516,546
BATTERY ASSEMBLY JIG
Filed Nov. 2, 1946  4 Sheets-Sheet 3

INVENTOR.
C. Stanley Brown
BY
ATTORNEY

July 25, 1950 C. S. BROWN 2,516,546
BATTERY ASSEMBLY JIG
Filed Nov. 2, 1946 4 Sheets-Sheet 4
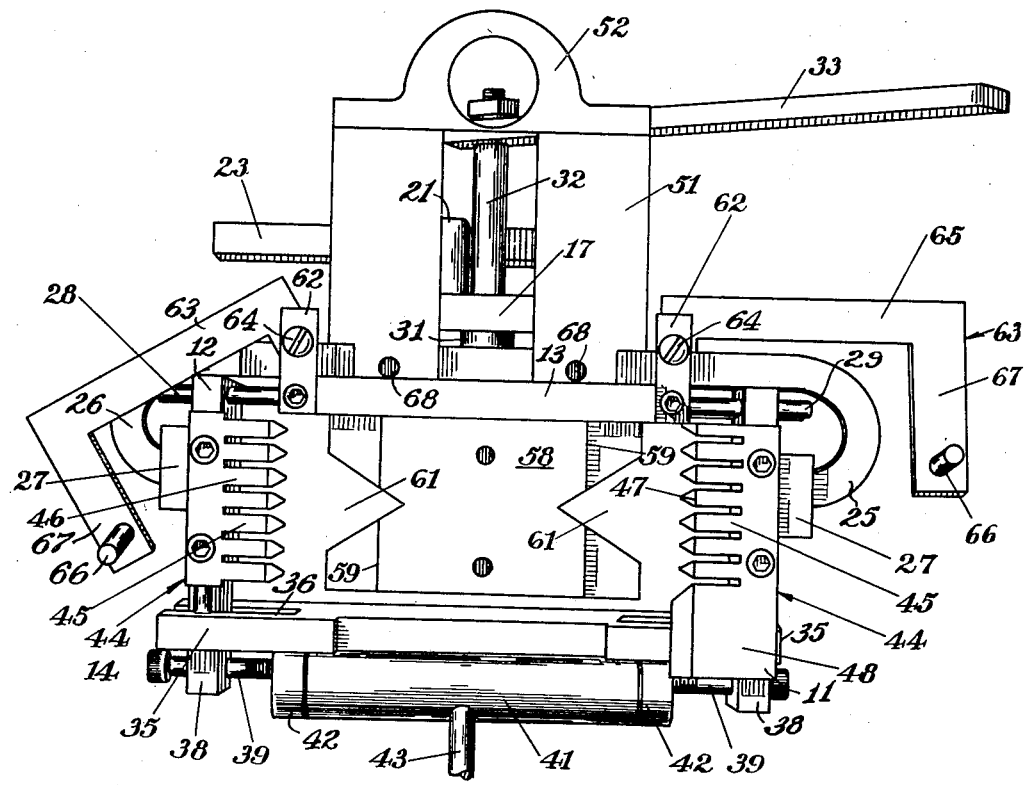
Fig. 7
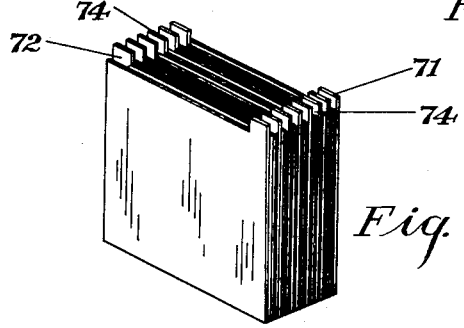
Fig. 8
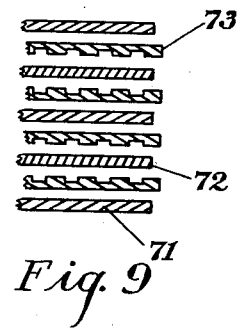
Fig. 9
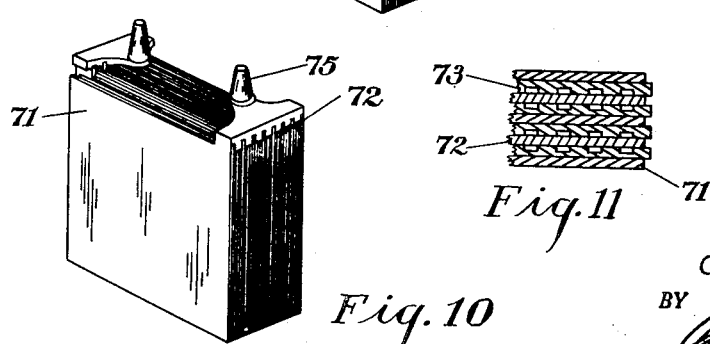
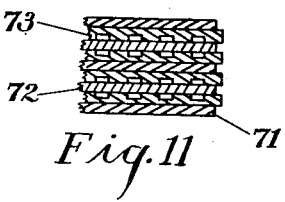
Fig. 11
Fig. 10
INVENTOR.
C. Stanley Brown
BY
ATTORNEY Patented July 25, 1950

2,516,546

UNITED STATES PATENT OFFICE 2,516,546

BATTERY ASSEMBLY JIG

Cecil Stanley Brown, Louisville, Ky., assignor to Solar Corporation, Milwaukee, Wis., a corporation of Delaware Application November 2, 1946, Serial No. 707,407

9 Claims. (Cl. 113—59)

This invention relates to a jig, and more particularly to a jig for assembling and fabricating battery units for assembly prior to activation and final assembly in a storage battery.

In the manufacture of storage batteries, it is necessary to combine sets of plates (grids plus activating material) of eventual opposite polarities with separators, the elements being combined to form a cell. The plates are formed with lugs which must be aligned in the assembly and "burned" or melted into an integral mass with suitable terminals. The problem of assembling the two different types of plates with the separators therebetween and burning the lugs of the two sets of plates to electrically connect the plates of each type to a convenient terminal, usually located atop the cell, has been a considerable one. Machines of many types have been proposed for this purpose. None, so far as I am aware, have been of sufficient worth to be used commercially. As a result, the respective plates and separators are assembled by hand. The usual procedure is to assemble the plates of each polarity separately in a rack and burn the lugs thereon to a terminal. The two sets of plates are then interleaved by moving them together endwise. After being thus combined, the separators, of the wooden or glass type, are introduced individually between each pair of adjacent plates. This is a tedious and time-consuming operation and at best results in a hand-made job wherein the plates are not always uniformly spaced. Uniform spacing in such a cell is highly important because of the desirability of securing a uniform flow of power from the plates in the cell and preventing shorts therein.

In improving upon the prior art, it is an object of my invention to provide a novel jig wherein the different plates and separators, going to make up a single cell, may be loosely assembled by placing each element adjacent another, the jig thereafter being operable to simultaneously bring the assembly together as a unit of the final desired dimensions and align the individual plates relative to one another.

It is a further object of my invention to provide a novel jig wherein an initial loose assembly of plates and separators can be formed and clamped into a single unit of the final desired dimensions, the lugs of the two series of plates being aligned in a suitable mold for burning, the unit when removed from the jig being ready for activation and charging and final assembly in a battery.

It is a further object of my invention to provide a novel jig embodying means for receiving and aligning the several plates and separators of a battery, the lugs of the plates being suitably aligned in a mold for burning to a terminal, the jig having means including the aligning means and the mold elements for preventing the access of molten metal to the portions of the assembly other than the lugs to be burned to the terminals.

Still a further object of my invention is the provision of a novel jig capable of holding an assembly of lugged plates and separators for burning including means for aligning the individual lugs for burning and sealing them from the remainder of the assembly to prevent the access of molten metal thereto, the jig also including means to effect release of the burned lugs from the aligning means and subsequent removal of the completed assembly from the jig.

Further objects and advantages of my invention will be apparent from the following description taken in connecton with the attached drawings and appended claims:

Referring to the drawings;

Fig. 7 is a plan view of the inverted jig showing the manner in which it is opened to finally release the completed unit.

Fig. 8 is a perspective of a loose assembly of positive and negative plates and separators prior to being placed in the jig.

Fig. 9 is a partial section taken horizontally through Fig. 8 showing the approximate positions of the individual plates and separators.

Fig. 10 is a perspective of the completed battery unit as removed from the jig.

Fig. 11 is a partial horizontal section of the completed unit of Fig. 10 showing the final assembly of the plates and separators.

Figure 1:
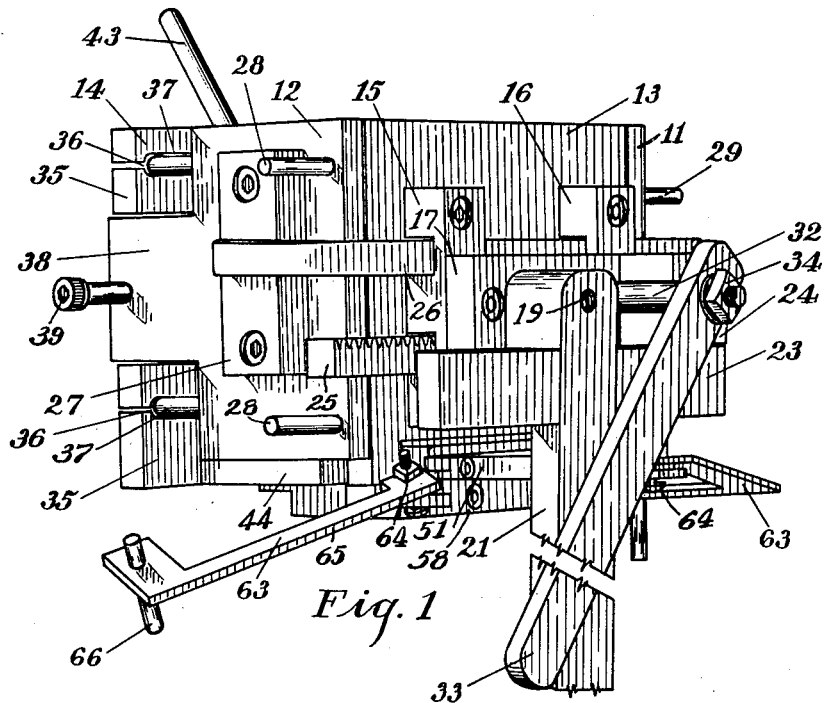
Fig. 1 is a perspective of a preferred embodiment of the invention shown mounted upon a suitable stand, the jig being in the closed position with the open end thereof extending upwardly.

The jig herein shown includes a generally box-like open-ended structure formed of opposing end walls 11 and 12 and opposing side walls 13 and 14. Side wall 13 while reversible with the jig as a unit is normally stationary so that the other three walls, 11, 12 and 14, move with respect to it. Relative thick bosses 15 and 16 are bolted or otherwise secured to side wall 13 and connected by a cross member 17, preferably bolted thereto, which mounts a pivot 18, also extending into side wall 13, arranged to be supported in a bearing aperture 19 formed in the upper end of an upright 21, the upright being supported on a suitable base such as shown at 22. A cross bar 23 is welded or otherwise secured to upright 21 to act as a stop for a relatively large lug 24 bolted or otherwise secured to cross member 17. By reason of pivot 18 and stop member 24 in cooperation with cross bar 23, the entire assembly can be quickly inverted from the position shown in Fig. 1 to the position shown in Fig. 6.

Figure 2:
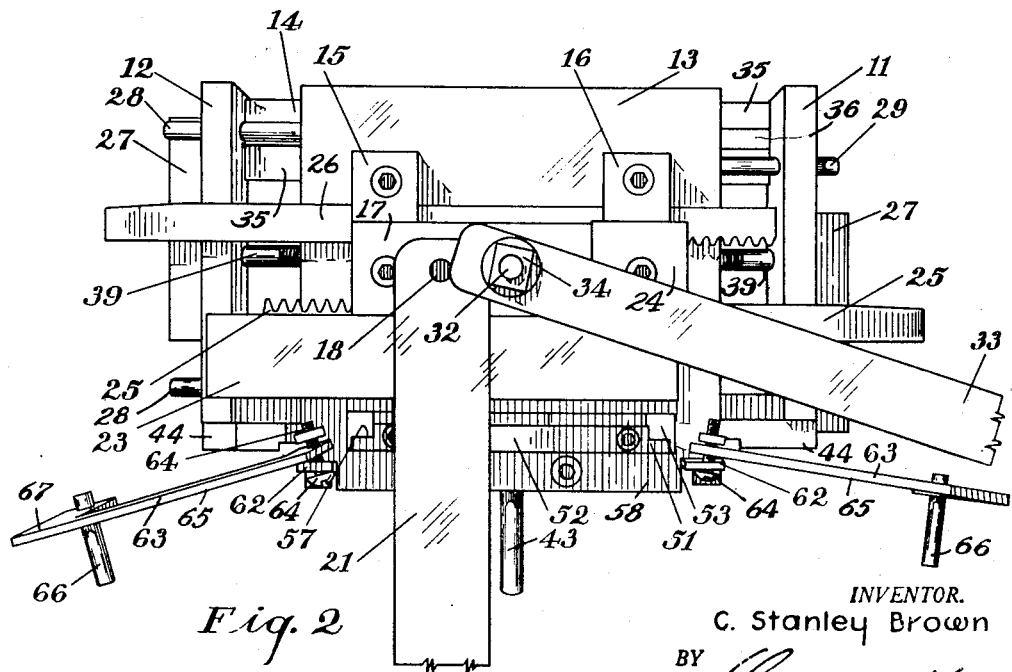
Fig. 2 is what may be designated as a front elevation of the jig as shown in Fig. 1, the jig being shown in open position.

Bosses 15 and 16 are slotted as shown in Fig. 1 to serve as guides for toothed racks 25 and 26, each of the racks having its outer end inwardly curved and anchored to an end wall through welding or similar manner of securing to bosses 27, the latter being bolted or otherwise secured to the end walls. To afford additional supporting means for the end walls and also permit their movement, pins 28 and 29 are provided on opposite ends of rigid wall 13 and these pins slidably engage the end walls 11 and 12. Racks 25 and 26 are reversely extended and retracted by a pinion 31 fixed to a shaft 32, journaled in cross bar 17 and connected in turn to a hand lever 33 keyed on the end of the shaft and secured as by a nut 34 threaded on the end of the shaft. Thus when lever 33 is swung under and leftward from the position shown in Fig. 2 to the position shown in Fig. 1, rack 25 is caused to move to the left as viewed in Fig. 2, end wall 11 to the left to the closed position shown in Fig. 5, end wall 12 being simultaneously moved in the opposite direction to the closed position shown in Fig. 5 by the reverse movement of rack 26.

Side wall 14 at the rear face of the jig is formed with extending sections 35 having horizontal slots 36 therein arranged to be engaged by pins 37 secured to the rear ends of end walls 11 and 12, this arrangement supporting and permitting relative movement of the walls. Extensions 38 on the rear ends of end walls 11 and 12 are substantially in vertical alignment with pins 37 and are arranged to bearingly support threaded pivot pins 39 which are threaded eccentrically into a roller or cam 41 rotatably mounted in bearing straps 42 secured to the rear face of wall 14, a hand lever 43 being threaded into roller 41 to manually effect rotation thereof. Preferably the end portions of the roller embraced by bearing straps 42 are of smaller diameter than the remainder of the roller to form shoulders adjacent the inner faces of the bearing strap to prevent axial movement of the roller. As evident from Fig. 4 where the cam is shown with wall 14 in open position, upon movement of lever 43 from a down to an up position, the cam rotates within the bearing straps and eccentrically about the axes of pins 39, causing wall 14 to move inwardly on pins 37 and extensions 38. Downward movement of lever 43 effects positive retraction of the wall to its open position.

Figure 5:
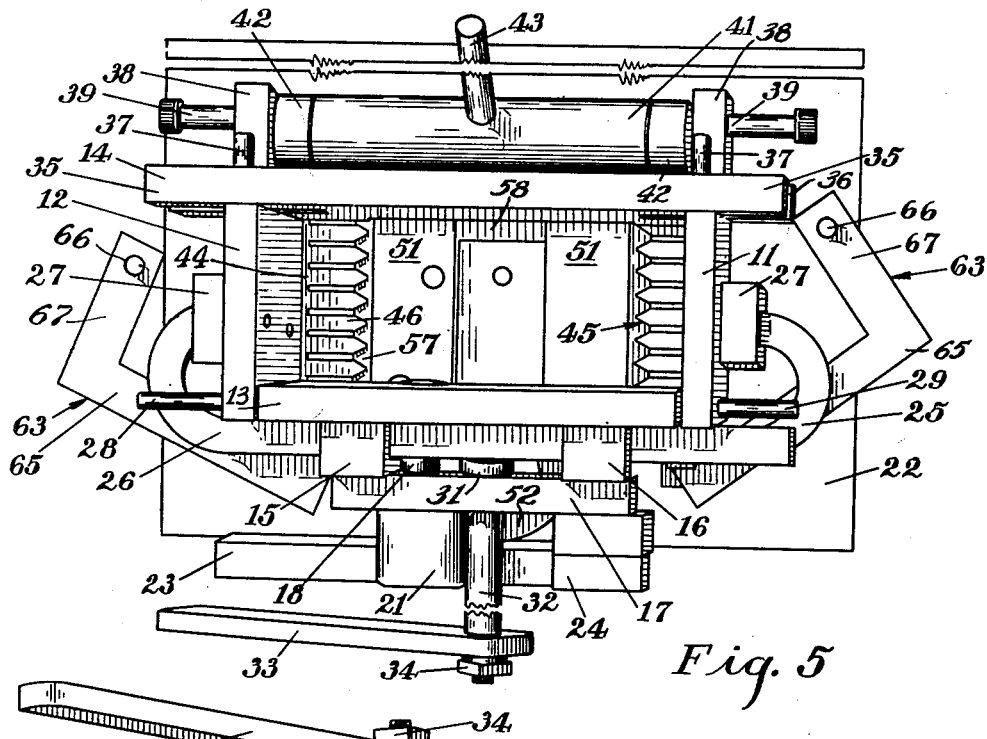
Fig. 5 is a plan view similar to that of Fig. 4 except that the jig is shown in closed position.

Each of end walls 11 and 12 adjacent the upper end of the jig as viewed in Fig. 7 or at the lower end of the jig as viewed in Fig. 5, has a member 44 bolted or otherwise secured thereto, member 44 including a comb-like structure 45 preferably composed of a plurality of spaced projecting teeth 46 formed on the top side as viewed in Fig. 7 with shoulders 47, substantially in alignment with one another. Member 44, secured to the edge of end wall 11, is preferably extended to form a stop lug 48 adjacent the end half-tooth to prevent the end plate of the loose assembly placed in the jig when open from sliding downwardly and preventing closure of the jig.

It will be noted that the teeth opposing one another are in substantially staggered relation since one set of teeth is designed to catch and align the lugs of the plates of one polarity, and the other set of teeth is designed to catch and align the lugs of the plates of the opposite polarity.

Figure 3:
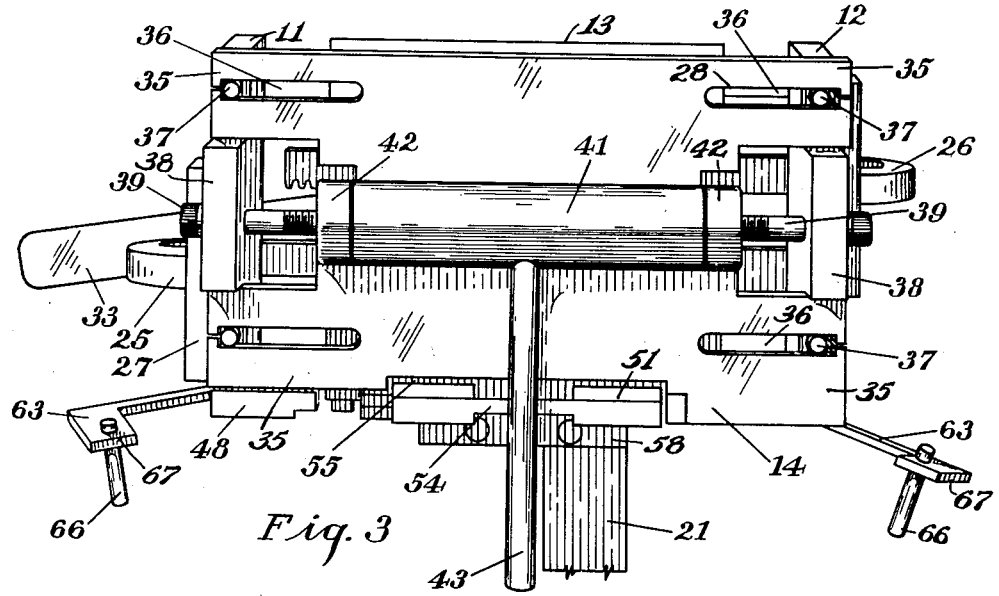
Fig. 3 is a rear elevation of the jig, also shown in open position.
Figure 4:
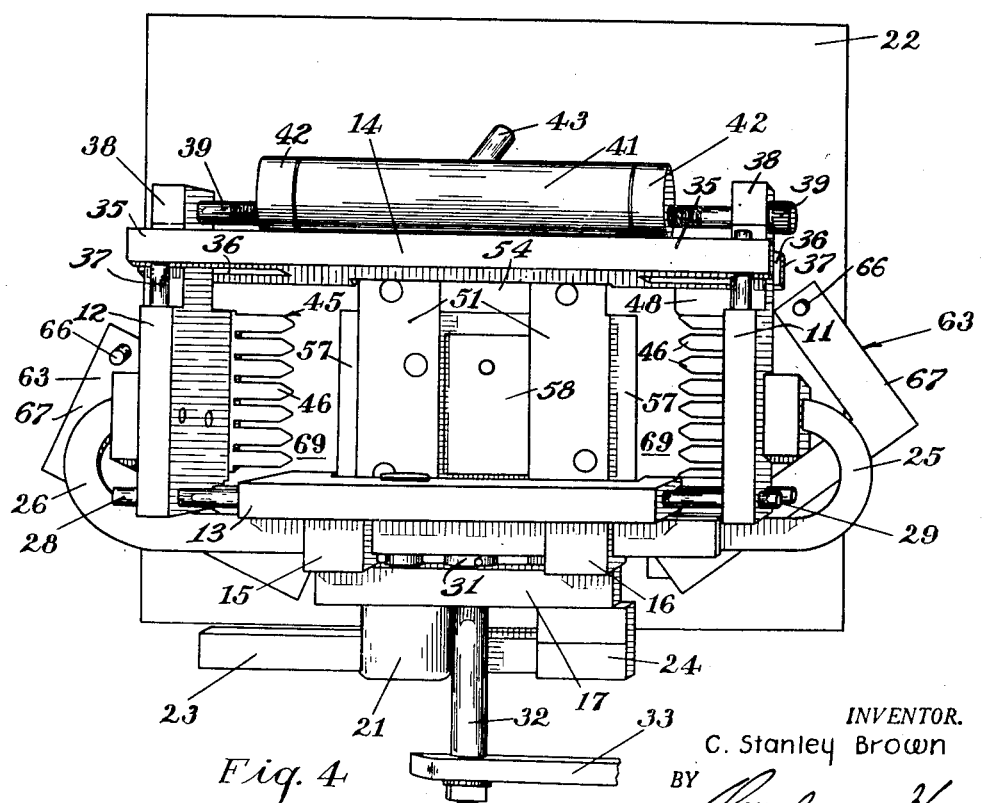
Fig. 4 is a plan or top view of the jig in the open position.
Figure 6:
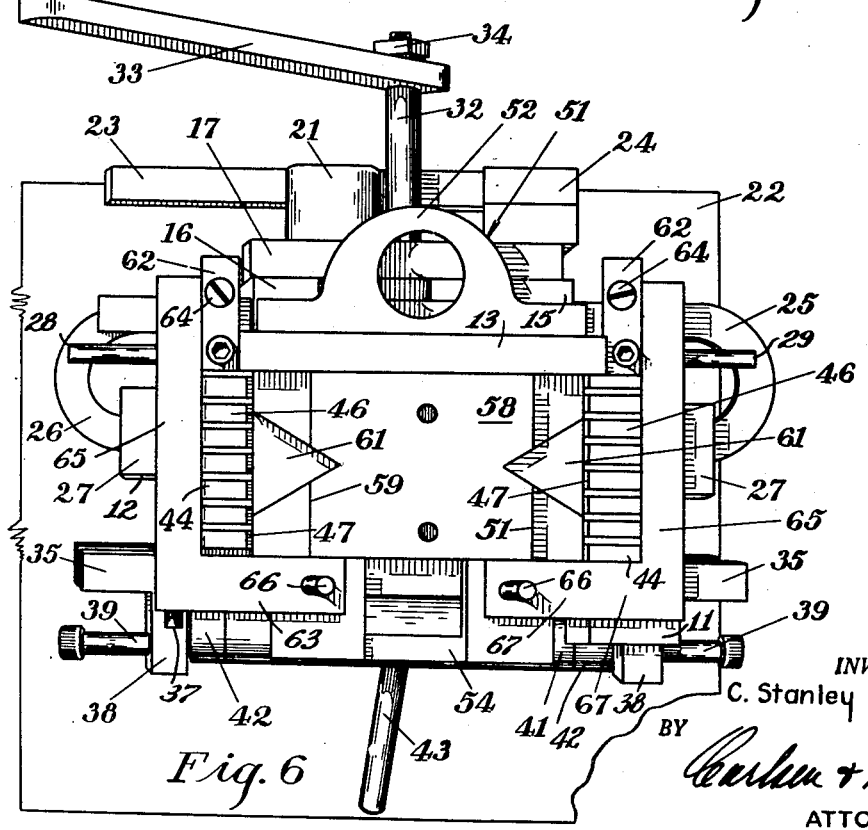
Fig. 6 is a plan view of the jig in closed and inverted position as when ready for the burning operation, except that the grid plates and their lugs are omitted.

A so-called stop member or slide 51 having a perforated handle 52 is mounted in a slot 53 (Fig. 2) in rigid wall 13 adjacent one open-end of the box-like cage or structure and arranged to be moved from an open position shown in Fig. 7 to a closed position shown in Figs. 4, 5 and 6. Stop member 51 is preferably formed of generally U-shape as shown, the open ends of the U opposite handle 52 being preferably connected by a strap 54 arranged to be caught by a pin or suitable stop in slot 53 of rigid wall 13 so that the stop member cannot be completely withdrawn from the jig, the full extent of the withdrawal being as shown in Fig. 7. Rear wall 14 is recessed at 55 (Fig. 3) so that it will clear the stop member in its movement. The stop member is of sufficient length to extend completely across the jig, even in the open position, as shown in Fig. 4. Stop member 51 is preferably formed, on the outer edges of the U-shape members, with a shouldered section 57 adapted to engage the shoulders 47 on comb assemblies 45 in a manner to effect a substantially liquid-tight seal for a purpose to be later described.

A mold plate 58 is suitably bolted or otherwise secured to the front wall or stationary plate 13 immediately above the stop member as shown in Fig. 6, the mold plate being provided with shouldered portions 59 and generally V-shaped or otherwise shaped notches 61 for a purpose to be later described.

Brackets 62 are rigidly secured to wall 13 on its upper end as viewed in Fig. 7, and movable mold elements 63 are loosely pivoted thereto at 64, said elements each including a bar or section 65 adapted, in the burning position shown in Fig. 6, to be positioned immediately outwardly and just above the comb assemblies 44, the elements being locked in this position by pins 66, on mold elements, legs 67, engaging in apertures 68 (Fig. 7) of stop member 51.

With the stop member, the mold plate and the pivoted mold elements in the position shown in Fig. 6, two terminal molds for the burning of the contained element are formed.

*Operation*

In the operation of the jig shown herein, the jig is positioned as shown in Fig. 4, the desired number of positive and negative plates separated by conventional separators, being placed loosely therein but all in the order in which they are to be and with the lug ends down. In the jig of the size illustrated, 8 negative plates and 7 positive plates with the necessary separators are placed in the jig to form a 15 plate battery element. The assembly, as placed in the jig is generally as shown in Figs. 8 and 9, the negative plates being shown at 71, the positive plates at 72, and the separators at 73. The plates are of conventional type having lugs 74 projecting from upper end corners thereof. In the loose assembly, the plates are so disposed that all the lugs are at the normally upper end of the assembly, the lugs of the plates of the same polarity being disposed at opposite sides as shown. The loose assembly is inverted and placed in the open jig of Fig. 4, the lugs projecting downwardly through the open space indicated at 69, and the lower (normally upper) edges of the plates and separators being held against downward movement by stop member 51 upon which the pack rests.

Any possibility of the end plate (in upper right corner as seen in Fig. 4) jamming the jig when moved to closed position is eliminated by lug 48 adjacent the half-tooth. Lever 43 is then moved to an upright position to rotate cam 41 and move plate 14 into the position shown in Fig. 5. This action insures the correct lateral dimensioning of the assembly. Lever 33 is then moved to cause end walls 11 and 12 to move inwardly to the position shown in Fig. 5. With the inward movement of the end walls, comb assemblies 45 engage the lugs projecting through openings 69 (Fig. 4) to separate the plates and effect their proper alignment relative to one another by reason of the engagement of the projecting teeth with the lugs, each lug being eventually located in the desired relative position between two adjacent teeth of the comb, as will be evident from Figs. 5 and 6.

In this position, the assembly is securely clamped, a substantially liquid tight seal being formed by shoulders 47 on the comb assemblies 45 and the shoulders 57 on the stop member. The jig is then inverted about pivot 18 to the position shown in Fig. 6. In this position the lugs of the plates are projecting upwardly between the several teeth on the comb assemblies and are fitted sufficiently tight therein to substantially effect a liquid-tight seal therewith. Mold elements 63 are then swung from the position shown in Fig. 7 to the position shown in Fig. 6 and locked by pins 66.

In the burning operation, the terminals 75 to be secured to the respective groups of lugs are positioned in the mold recesses 61 and, by the application of a blow torch flame, the terminals and plate lugs are melted or fused together with the addition of such molten lead as may be required. By reason of the two molds formed at either end of the jig, all the lugs are quickly secured together in integral masses with the terminals, there being no possibility of any hot lead passing downwardly below the mold into contact with the underneath plate sections or separators.

After cooling, the unit is removed by retracting the side and end walls through manipulation of levers 33 and 43. Since the comb-like structures 45 are securely held between the lugs, the upper ends of which have now been welded into two solid masses, the movable mold elements 63 are left in the locked position of Fig. 6 and function to prevent outward movement of the integral lugs and terminals when the side walls are opened, the comb-like members 45 thus being withdrawn entirely clear of the lugs. In this position, the plate and separator assembly is held only by stop member 51 immediately beneath the terminals in V-shaped notches 61 in engagement with the undersurfaces of the terminals. Mold elements 63 may now be swung to the position shown in Fig. 7 and stop member 51 withdrawn as shown in the same figure whereupon the completed assembly can be removed from the bottom of the jig and in most cases will fall freely therefrom.

Upon removal from the jig, the separators will be found slightly below the position desired in the final assembly and will be found to be projecting from the lower end thereof. This situation can be readily corrected by striking the separators sharply on the lower edges whereupon they will move upwardly in the unit to their proper position.

In this connection, it may be explained that such displacement of the separators below the normal final assembly position is a condition that produces an advantage in the remaining process. Thus, if the (normally) bottom edges of the plates are flush with the bottom edges of the vertically longer separators the separators would project above the plates, or between the lugs, to interfere with the combs and burning operation. But by reversing the assembly and letting the bottom (normally upper) edges of separators and plates rest flush on the stop slide 51, the separators will be out of the way and will be clamped in that arrangement until after jig has been reversed, the posts burned on, and the assembly discharged from the jig, after which the above referred to step of striking or moving the separators up into their normal or final position becomes a very simple matter.

It is to be understood that any type post with any type terminal such as straight or toed can be used with the jig illustrated, the shape of mold recess 61 being only by way of illustration.

If desirable, the incomplete units as shown in Fig. 8, may be previously grouped in suitable boxes of desired size and thus fed to the jig operator.

The final unit is of the type shown in Figs. 10 and 11, it having been found that uniformity in the spacing of the plates is much improved, thus eliminating any possible short of the battery and insuring a more uniform flow of power.

It may here be noted that while the teeth 46 of each comb are relatively fixed or rigid the combs themselves may be substituted for other combs with different widths and spacings of teeth as occasion may require. It should also be observed that the widths of the teeth may vary depending upon whether or not the plate and separator elements of the assembly are to be slightly spaced, or are to be assembled in a tight or compact unit. The compact arrangement has the advantage of permitting the use of more plates per cell, but the spaced arrangement permits better fluid circulation and gas discharge between the plates and separators. Where the close grouping is to be had then the comb teeth 46 do little more than serve as sealing elements, but where the spaced condition is desired they will also maintain the desired relationship even though the assembly is brought in closer by the clamping action between the side walls 13 and 14. In this event, however, the plates and separators will return to their desired spaced relationship as determined by the lugs, and after the side wall pressure has been released.

While I have illustrated the jig as rotatably mounted on a stand, it is to be understood that it may be used on a bench without the stand or a series of jigs may be mounted on a conveyor whereon different operators will perform the different steps of forming the complete assembly.

It is to be understood that this invention may be embodied in various battery units of different shapes and different sizes and that the illustrated embodiment is only by way of illustration and is not to be considered restricted or limited, the breadth of the invention being indicated by the attached claims.

Having described my invention, I claim:

1. A battery plate and separator assembling device comprising a jig adapted to receive the plates and separators in prearranged order with the lug ends of the plates extending downwardly, means for reversably mounting the jig whereby the plate lugs will be extended upwardly, and means forming a mold recess about the lugs of each plate polarity, said mold recess forming means including retractible elements extending between the lugs of each polarity group to form a molten metal seal between the outer ends of the lugs and the plates and separators proper.

2. An assembling device adapted to receive lugged battery plates in prearranged order and with the lugs extending from the plates in an aligned series, a comb-like member having teeth retractibly extending between the plate lugs to uniformly space the lugs, means cooperating with the comb-like member to form a terminal mold recess, and means for mounting the comb-like member whereby the teeth thereof may be moved into and out of position between the lugs, said cooperating means including an adjustable member adapted to bear against the terminal molded in the recess when the teeth of the comb-like member are retracted from between the lugs.

3. A battery plate and separator group assembling device comprising, a support, a jig pivotally mounted on the support for alternate movement into two reverse positions and adapted to receive the plates and separators in predetermined order and with lug ends of the plates downward, means forming a bottom stop to limit downward movement of the plates and separators in the jig, inwardly adjustable guide means releasably engageable with the edges of the plates and separators and with the outer faces of the group to form them into a group unit of predetermined lateral and longitudinal dimensions, and means forming terminal molds about the plate lugs, when the jig is reversed to direct the lugs upwardly, whereby terminals may be formed with the lugs and thereby also secure the group unit approximately within the aforesaid dimensions when the guide means is released.

4. A battery plate and separator assembling jig comprising, a relatively fixed side wall, a pair of end walls, means carried by said side wall for adjusting the end walls inwardly and outwardly with respect to each other, a second side wall opposite the first mentioned side wall, and means carried by the end walls for adjusting the second side wall with reference to the first mentioned side wall.

5. An assembling jig for battery plates and separators comprising a reversible cage having side walls and movable end walls adapted to receive the plates and separators in relatively final positions with respect to each other but with the rows of terminal lugs of opposite polarity extending downwardly from the plates at opposite sides of the group, a mold plate extending from one of the side walls to overlie the upper edges of the plates between the rows of lugs, and teeth carried by the upper ends of the end walls, so as to be movable therewith, and to pass between the plate lugs and inwardly therebeyond to cooperate with the mold plate to form terminal mold recesses.

6. An assembling jig for battery plates and separators comprising a cage having side walls and movable end walls adapted to receive the plates and separators in relatively final positions with respect to each other and with rows of terminal lugs of opposite polarity extending from the plates at opposite sides of the group, combs carried by the end walls for engagement with the lugs, means for slidably connecting the movable end walls to the side walls, and means for simultaneously adjusting the end walls in opposite directions, said last mentioned means including a pair of bars slidably mounted on one of the side walls and each bar being connected to one of the end walls, and means for simultaneously actuating the bars in opposite directions.

7. An assembling jig for holding battery plates and separators in proper relative positions for final use and with the lugs of the plates extended upwardly for positioning to be burned into common terminals one at each side of the jig, comprising a cage-like receptacle reversibly adjustable to receive and discharge the assembly, tooth members carried by opposite wall members of the receptacle and extending between the lugs to form mold bottoms, a mold plate mounted on the receptacle and overlying the upper edges of the plates and extending to the inner ends of the tooth members, and a stop plate slidably associated with the mold plate and cooperating therewith and with the tooth members to form mold recesses, said stop plate being mounted for sliding movement in a direction at right angles to the planes of the plates.

8. A device for assembling battery units composed of lugged plates and vertically longer separators, comprising a support, a jig pivotally mounted on the support and opening upwardly to receive the plates and separators when placed therein in pre-arranged sequence and with the normally upper or lugged ends of the plates directed downwardly, a stop member at the bottom of the jig extending crosswise of the plates and separators, between opposite sets of lugs, and upon which the depending edges of the plates and separators will rest with the separators offset upwardly from their normal operative positions relative to the plates, means incorporated in the jig for clamping the plates and separators together against relative movement with respect to each other in the jig, means for reversing the position of the jig about its pivotal mounting on the support so that the lug ends of the plates will extend upwardly, means forming upwardly opened terminal molds about the plate lugs at both sides of the jig when the jig is so reversed, said mold forming means including said stop member and cooperating teeth mounted on the jig and which teeth project inwardly between the lugs over the now downwardly offset separators and to the stop member, said mold forming teeth and stop member being of such thickness that when removed from under the terminals so formed will permit the now downwardly offset separators to be moved upwardly into their normal positions when the aforesaid clamping pressure against the plates and separators has been released.

9. A device for assembling battery units composed of lugged plates and separators, comprising a jig, means for mounting the jig whereby it may be alternately moved into receiving and discharging positions, said jig opening upwardly, when in its receiving position, whereby a prearranged group of plates and separators may be placed therein with their normally upper ends directed downwardly, and with the separators slightly offset in an upward direction with respect to their inverted positions between the plates, means for clamping the plates and separators together to maintain said offset relationship when the jig is turned to its discharging position, relatively adjustable cooperating members mounted on the jig and forming upwardly opening terminal molds about the plate lugs when the jig is in its discharging position, said members including combs the teeth of which extend between the plate lugs adjacent the normally upper edges of the offset separators so that when the combs are removed and the clamping pressure released the plates and separators may be discharged downwardly from the jig and the separators may be moved upwardly between the plates from such offset position to their normal operative positions therebetween.

CECIL STANLEY BROWN.

REFERENCES CITED

The following references are of record in the file of this patent:

UNITED STATES PATENTS

| Number | Name | Date |
| --- | --- | --- |
| 871,393 | Flanders | Nov. 19, 1907 |
| 1,625,384 | Woodall et al. | Apr. 19, 1927 |
| 1,932,136 | Hole | Oct. 24, 1933 |
| 1,960,195 | Nyce | May 22, 1934 |
| 2,430,188 | Sargent | Nov. 4, 1947 |